United States Patent Office

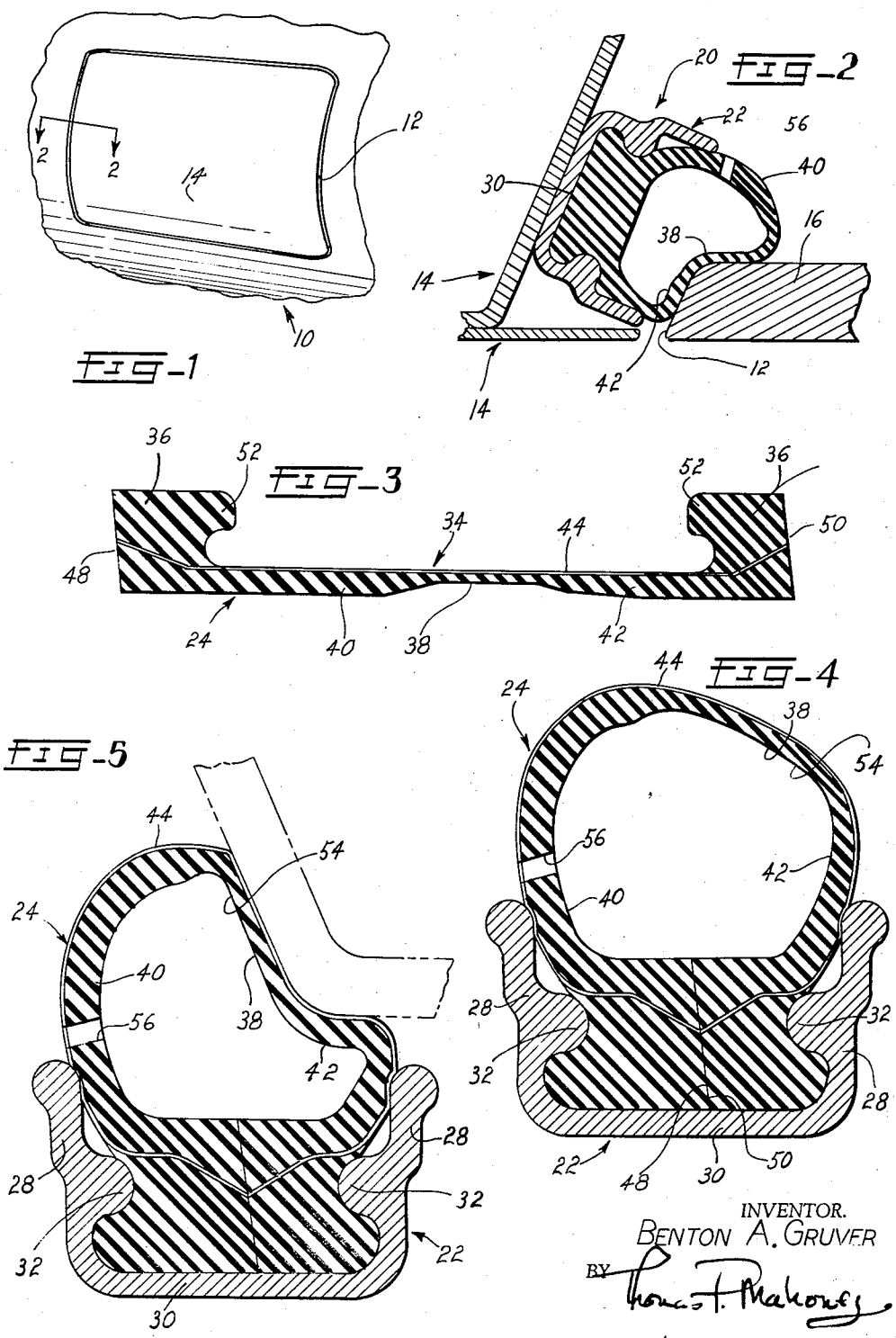

2,969,252
Patented Jan. 24, 1961

2,969,252

SEAL

Benton A. Gruver, North Hollywood, Calif., assignor, by mesne assignments, to Gruver and Associates, Inc., a corporation of California Filed Aug. 25, 1958, Ser. No. 756,843

2 Claims. (Cl. 288—22)

This invention relates to a fluid seal and, more particularly, to a fluid seal adapted for use in sealing the gap between a closure and the edge of the opening in which said closure is located.

The seal of the invention has particular application to the sealing of closures in pressurized aircraft and will be described as utilized in that environment. However, it is to be understood by those skilled in the art that the principles of the invention may be applied with equal cogency to other environments and it is not intended that the utilization of the invention be limited to the particular environment discussed hereinbelow.

It is, of course, well known to those skilled in the art that considerable difficulty is encountered in sealing closures in pressurized aircraft, such as access doors and the like. Leakage about the perimeter of such access doors can place an undue load upon the pressurizing equipment of the aircraft and, if sufficiently significant, can create an actually hazardous condition for the passengers in the aircraft.

It is, therefore, an object of my invention to provide a seal for an aircraft closure which is adapted to effectively seal the gap between the closure and the perimetrical edge of the opening in which the closure is located.

One of the major problems encountered with conventional seals is the fact that such seals are frequently incapable of conforming adequately and in a proper sealing relationship with the striker portion of the closure juxtaposed thereto so that, as the seal engages the striker portion of the closure, minute gaps permitting fluid flow past the seal occur.

Another object of my invention is the provision of a seal of the aforementioned character which includes an elongated, substantially tubular body, said tubular body including a base portion adapted to be inserted in a mating supporting channel or retainer and a wall portion which incorporates an intermediate diaphragm section adapted to be engaged by the contiguous area of the striker on a juxtaposed closure, so that when the striker engages the diaphragm area deflection of said diaphragm area will occur and effective sealing action of the diaphragm area against the striker will be created.

A further object of my invention is the provision of a seal of the aforementioned character which is adapted to be molded in the form of an elongated strip or body, said strip including an intermediate planar portion having basal portions at its opposite edges or extremities whereby, when said strip is folded to bring said basal portions in contiguity to each other, the planar portions will be bent into approximately semi-circular form to engage a closure striker juxtaposed thereto.

An additional object of my invention is the provision of a seal of the aforementioned character wherein the planar portion thereof includes an intermediate diaphragm portion of reduced cross section, said diaphragm portion constituting, when the seal is folded upon itself in the above described manner, a diaphragm section adapted to be engaged by the striker of an associated closure.

A further object of my invention is the provision of a seal construction which includes, not only the above described seal, but a seal mounting channel, said seal mounting channel having detent means provided upon a wall thereof which are engageable with corresponding detent means on the basal portion of the seal to retain said basal portion of the seal in operative engagement with said channel.

A further object of my invention is the provision of a seal of the aforementioned character which, in addition to including the split basal portion, includes a sealing wall characterized by a relatively rigid inboard section adapted to provide a mechanical weather seal when a closure is imposed upon the seal and which includes an intermediate, thin diaphragm section incorporated in the striker contact area of the seal and which further includes a relatively rigid section in the outboard portion thereof adapted to seal against high differential pressure as this portion of the seal spans the gap between the striker of the closure and the adjacent area of the seal supporting channel or retainer.

Other objects and advantages of my invention will be apparent from the following specification and the accompanying drawing which is for the purpose of illustration only and in which:

Fig. 1 is a front elevational view of a typical closure installation incorporating a seal construction manufactured in accordance with the teachings of my invention;

Fig. 2 is a transverse, sectional view taken on the broken line 2—2 of Fig. 1;

Fig. 3 is an enlarged, transverse, sectional view showing the seal of my invention in its unfolded condition;

Fig. 4 is an enlarged, transverse, sectional view showing the condition of the seal prior to the imposition of the striker thereupon; and Fig. 5 is a transverse, sectional view showing the position assumed by the diaphragm portion of the seal when it engages the seal striker associated therewith.

Referring to the drawing and particularly to Figs. 1–2 thereof, I show a portion 10 of an aircraft fuselage which incorporates an access opening 12. A door or closure 14 is adapted to be maintained in said access opening 12 by conventional latch or other means, not shown, and said access opening has a seal striker 16 mounted on its perimetrical edge. It should be noted at this juncture that, while the seal striker is shown as mounted on the perimetrical edge of the opening 12, it may, in some installations, be mounted upon the door 14 itself and it is not intended that the teachings of the application be limited to the positioning of the striker or seal construction in any particular location.

Mounted upon the perimeter of the door 14 is a seal construction 20 manufactured in accordance with the teachings of my invention and including, generally, a seal retaining channel 22 fabricated from aluminum or other metal and a seal 24 fabricated from silicone rubber or similar resilient material.

The seal retaining channel 22, as best shown in Figs. 4 and 5 of the drawing, is of generally U-shaped configuration including outwardly directed, laterally spaced legs 28 and a bight portion 30 between said legs. Formed integrally with the interior surfaces of the legs 28 are inwardly protruding detents 32, for a purpose to be described in greater detail below. The upper extremities of the legs 28 are slightly bulbar in configuration and serve as supports for the seal 24.

The seal 24 is adapted to be molded in a flat form, as best shown in Fig. 3 of the drawing, and when so molded includes a planar portion 34 whose opposite edges or extremities terminate in basal retention portions 36. The planar portion 34 is subdivided into an intermediate, relatively thin and flexible diaphragm section 38, an inboard, thicker and more rigid section 40, and an outboard section 42 which is more rigid than the adjacent diaphragm section 38.

A reinforcing membrane 44 is applied to the side of the planar portion 34 of the seal 24 which is ultimately exposed to contact by the seal striker 16, in a manner to be described in greater detail below, and may be formed from "Dacron" or other synthetic materials and has its opposite extremities terminating in the basal portions 36 of the seal.

It will be noted that the left-hand basal portion 36 of the seal 24 is, as best shown in Fig. 3 of the drawing, provided with an inwardly inclined side wall 48, while the right-hand basal portion is provided with an outwardly inclined side wall 50.

In installing the seal 24 in the seal retaining channel 22 to create the seal construction 20, it is merely necessary to measure the length of the channel and to cut a corresponding length from a strip embodying the seal 24. When the corresponding length has been cut, the opposite extremities of the strip may be joined by cementing a reinforcing patch to the top of the planar portion 34 of the strip 24. When a splice has been made between said extremities, the strip 24, which has now assumed an elliptical or ring-like configuration, can be folded about its longitudinal axis to expose the fabric membrane coated side of the planar portion 34 and to bring the inclined side walls 48 and 50 of the basal portion 36 of the strip in contiguity to each other.

The basal portions 36 of the seal 24 are provided with laterally projecting detent lugs 52 and the basal portions 36 can be forced into the retaining channel 22 until the detent lugs 52 engage below the detents 32 provided on the interior surfaces of the legs 28 of the retaining channel 22, thus serving to retain the seal 24 in operative engagement with the channel 22 and to press the contiguous inclined walls 48 and 50 of the basal portions 36 of the seal 24 into sealing engagement with each other.

After the seal 24 has been assembled in operative relationship with the seal retaining channel 22, it will assume the configuration shown in Fig. 4 of the drawing wherein the planar portion 34 of said seal defines a semicircular bulb defining a pressure chamber 54 which is adapted to communicate with the pressurized area of the aircraft through vents or ports 56 formed in the inboard section 40 of the seal 24. It will be noted that, as best shown in Figs. 3–5 of the drawing, the inboard section 40 of the planar or wall portions 34 of the seal 24 is quite long and is substantially thicker than the intermediate diaphragm portion 38 of the seal, while the outboard portion 42 is as thick as the inboard portion 40 but is substantially shorter than said inboard portion.

The term "inboard," of course, refers to the fact that the inboard portion 40 of the planar portion 34 of the seal is exposed to the interior pressure of the aircraft and the word "outboard," of course, refers to the fact that the outboard portion 42 of the planar portion 34 of the seal 24 is exposed to atmospheric pressure outboard of the aircraft in which the seal 24 is utilized.

It should also be noted that when the seal 24 is installed in operative engagement with the seal retaining channel 22, the upper extremity of the inboard leg 28 engages and partially supports the inboard wall section 40 against inward deflection, while the outboard leg 28 of said retaining channel serves correspondingly to support the outboard leg portion 42 of the wall of the seal 24. Furthermore, it will be noted that the extremities of the membrane 44 are juxtaposed to each other by the juxtaposition of the inclined walls 48 and 50 in sealing relationship, as best shown in Figs. 4 and 5 of the drawing.

The intermediate diaphragm portion 38 of the seal 24 is, as best shown in Figs. 3–5 of the drawing, considerably thinner in cross section than the adjacent inboard and outboard portions 40 and 42 of the wall of the seal 24 and is thus more readily subject to deflection by the striker 16 in the manner shown in Fig. 5 of the drawing. Therefore, when the striker 16 engages the diaphragm section 38, an enlarged, more effective sealing area is achieved by the manner in which the diaphragm 38 acts to receive the striker 16 and to seal against the surface thereof. It will be noted that the diaphragm portion 38 of the seal 24 engages a substantial portion of the striker 16 and thus eliminates the possibility that surface inequalities in the striker may cause leakage past the seal 24.

When the seal 24 is engaged by the striker 16 in the manner shown in Fig. 5 of the drawing, the inboard wall section 40 is sufficiently high and stiff enough to create a mechanical weather seal upon closing of the striker 16 against the seal 24. The thin diaphragm section 38 of the seal wall permits a low closing load to be achieved and the relatively thick and rigid outboard wall section 42 seals against the high differential pressure in the gap between the striker 16 and the upper extremity of the contiguous leg 28 of the seal retaining channel 22. The vents or ports 56 in the inboard wall section 40 permit the seal 24 to be self-energized because a differential pressure is created between the inboard and outboard sides of the seal 24.

In addition, the mechanical retention of the seal 24 in the associated seal retaining channel 22 and the achievement of the mechanical seal between the contiguous inclined faces 48 and 50 of the basal portions 36 of the seal 24 eliminates the necessity for the utilization of adhesives to accomplish the adherence of the seal 24 to the channel 22. The seal 24 may be merely installed in the channel 22 by the use of a blunt plastic tool and can similarly be removed from operative relationship with said channel.

Another advantage of the seal 24 of my invention is the fact that the seal 24 is molded in flat or open condition, permitting the achievement of greater accuracy in maintaining the varying dimensions of the various wall sections which results in optimum seal performance and the split base achieved by the two basal portions 36 of the seal 24 facilitates the installation of the seal 24 in highly contoured surfaces and sharp corner radii.

Another advantage of fabricating the seal 24 in flat or open condition is the fact that the fabric reinforcement and the wall thickness of the seal can be readily inspected and, of course, the seal can be readily spliced or repaired by opening the split base constituted by the basal portions 36 and inserting the splice or repair portion.

I claim:

1. In a seal, the combination of: an elongated support channel incorporating detent means in the wall thereof; and an elongated sealing member located in said channel and including a base constituted by separable basal portions engaging at a juncture line having detents engaging said detent means and a flexible wall formed integrally with said base, said wall including a relatively rigid inboard wall section, an intermediate flexible diaphragm of reduced cross section located eccentrically with respect to the juncture line between said basal portions and a relatively rigid outboard wall section, said inboard section having ports therein for communication with a pressurized atmosphere and said diaphragm and outboard section being imperforate.

2. In a seal, the combination of: an elongated support channel incorporating detent means in the wall thereof; and an elongated sealing member located in said channel and including a base constituted by separable basal portions engaging at a juncture line having detents engaging said detent means and a flexible wall formed integrally with said base, said wall including a relatively rigid inboard wall section, an intermediate flexible diaphragm of reduced cross section located eccentrically with respect to the juncture line between said basal portions and a relatively rigid outboard wall section, said inboard section having ports therein for communication with a pressurized atmosphere and said diaphragm and outboard section being imperforate, said wall having a fabric covering thereupon with the opposite extremities of said covering being located within said separable basal portions and meeting at said juncture line.

References Cited in the file of this patent

UNITED STATES PATENTS

| | | |
|---|---|---|
| 2,090,701 | Rodrick | Aug. 24, 1937 |
| 2,090,702 | Rodrick | Aug. 24, 1937 |
| 2,686,343 | Harpoothian et al. | Aug. 17, 1954 |
| 2,699,580 | Smith | Jan. 18, 1955 |